A. M. HILLS.

Improvement in Lawn-Mowers.

No. 116,188.                                                  Patented June 20, 1871.

116,188

UNITED STATES PATENT OFFICE.

AMARIAH M. HILLS, OF HOCKANUM, CONNECTICUT.

IMPROVEMENT IN LAWN-MOWERS.

Specification forming part of Letters Patent No. 116,188, dated June 20, 1871.

*To all whom it may concern:*

Be it known that I, AMARIAH M. HILLS, of Hockanum, in the county of Hartford and State of Connecticut, have invented a new and useful Improvement in Lawn-Mowing Machines; and I do hereby declare that the following is a full, clear, and exact description of the same, reference being had to the accompanying drawing and to the letters of reference marked thereon making a part of this specification.

This invention relates to certain improvements in lawn-mowing machines, and more especially refers to improvements on a machine for such purpose for which Letters Patent were granted to me bearing date January 28, 1868, and reissued July 14, 1868, and March 16, 1869. This invention consists of a stop or bearing arranged, in relation to a pivoted handle, substantially as hereinafter described.

Figure 1:
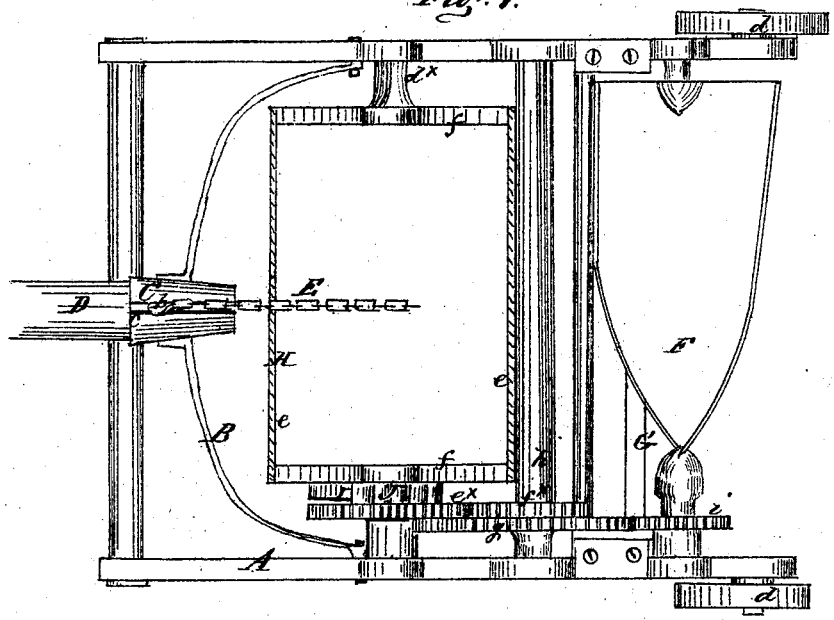
Figure 2:
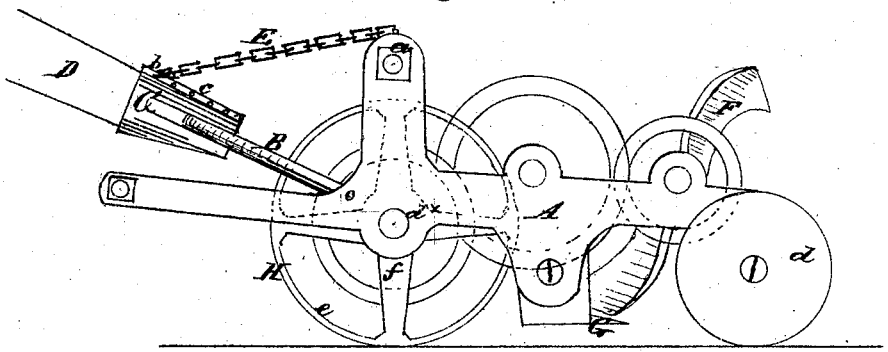

In the accompanying drawing, Figure 1 represents a plan or top view of my invention, the roller being in section. Fig. 2, a side view of the same.

Similar letters of reference indicate corresponding parts in the two figures.

A represents the frame of the machine, which may be constructed substantially in the same way as that in the machine originally patented. B is a bail-shaped rod, the ends of which are fitted or pivoted loosely to the sides of the frame A in such a manner that the bail may move freely up and down. This bail-shaped rod has a socket, C, at its center to receive the handle D, which may be of wood. E is a chain, which is attached at one end to a transverse bar, *a*, or to any suitable fixture on the machine; at a point about over its center would be preferable. The other end of this chain may be fitted, by means of a hook, *b*, in any of the series of holes made in a flange, *c*, on the upper part of the socket C. (See more particularly Fig. 2.) This arrangement of the chain with the transverse bar and perforated flanged socket forms an adjustable stop or bearing for the pivoted handle. The cutting device of the machine is composed of a rotary cutter, F, and a fixed blade, G, substantially the same as shown in my former patent.

By having the chain E attached to the handle, or rather to the socket in which the handle is fitted, it will be seen that the cutting device, by depressing the handle, may be raised above the surface of the ground in order to clear obstructions and to admit of the machine being turned with facility; and by adjusting the hook *b* in different holes in the flange *c* of the socket the handle may be retained at different heights to suit the operator. It will, of course, be seen that no special or arbitrary adjustment of any part is required in order to elevate the cutting device; the depressing of the handle is all that is necessary in order to accomplish that result.

Having thus described my invention, what I claim as new, and desire to secure by Letters Patent, is—

The combination of the flexible adjustable connection E with the pivoted handle D and frame A of a lawn-mowing machine, substantially as described.

AMARIAH M. HILLS.

Witnesses:
A. R. HAIGHT,
THEO. TUSCH.